(12) United States Patent
Watanabe

(10) Patent No.: US 9,851,006 B2
(45) Date of Patent: Dec. 26, 2017

(54) TAPER-FACED COMPRESSION RING AND WIRE THEREFOR

(71) Applicant: KABUSHIKI KAISHA RIKEN, Tokyo (JP)

(72) Inventor: Mamoru Watanabe, Kashiwazaki (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/420,159

(22) PCT Filed: Aug. 2, 2013

(86) PCT No.: PCT/JP2013/071020
§ 371 (c)(1),
(2) Date: Feb. 6, 2015

(87) PCT Pub. No.: WO2014/024799
PCT Pub. Date: Feb. 13, 2014

(65) Prior Publication Data
US 2015/0198249 A1 Jul. 16, 2015

(30) Foreign Application Priority Data
Aug. 9, 2012 (JP) .................................. 2012-177445

(51) Int. Cl.
*B60T 11/236* (2006.01)
*F16J 9/20* (2006.01)
*F02F 5/00* (2006.01)

(52) U.S. Cl.
CPC ........ *F16J 9/20* (2013.01); *F02F 5/00* (2013.01); *F16J 9/206* (2013.01)

(58) Field of Classification Search
CPC . F16J 9/20; F16J 9/26; F16J 9/14; F02F 5/00
(Continued)

(56) References Cited

U.S. PATENT DOCUMENTS 3,687,018 A * 8/1972 Sullivan ............... F16J 9/02
277/451
3,941,523 A * 3/1976 Shin ..................... F01C 19/12
277/357
(Continued)

FOREIGN PATENT DOCUMENTS

JP       44-27300       11/1969
JP       7-42417 U       8/1995
(Continued)

OTHER PUBLICATIONS

International Search Report issued in PCT/JP2013/071020, dated Sep. 17, 2013.
(Continued)

*Primary Examiner* — Nathan Cumar
(74) *Attorney, Agent, or Firm* — Birch, Stewart, Kolasch & Birch, LLP

(57) ABSTRACT

To provide a wire for a taper-faced compression ring, which can be provided with a running-in surface (contact surface) uniformly and rapidly in the production process of the taper-faced compression ring, a surface of the wire corresponding to an outer peripheral surface of the ring is provided with adjacent outward inclined first and second tapered portions, the inclination angle θ2 of the second tapered portion being larger than the inclination angle θ1 of the first tapered portion, and an outer end of the second tapered portion being located radially outward than an outer end of the first tapered portion by 0.005-0.05 mm. A long-life taper-faced compression ring with reduced friction and improved fuel efficiency is formed by the above wire, the second tapered portion having a lapped surface located radially outward than an outer end of the first tapered portion by 0.001-0.048 mm.

9 Claims, 3 Drawing Sheets

(58) Field of Classification Search
USPC .................... 277/434, 436, 310, 449, 488
See application file for complete search history.

(56) References Cited

U.S. PATENT DOCUMENTS

| | | | |
|---|---|---|---|
| 4,497,497 A * | 2/1985 | Berti et al. .................... 277/463 |
| 5,901,963 A * | 5/1999 | Hite ............................ F16J 9/20 |
| | | | 277/321 |
| 6,206,379 B1 * | 3/2001 | Toshiaki ................. F16J 9/203 |
| | | | 277/436 |
| 2002/0033579 A1 * | 3/2002 | Ishida ........................... 277/434 |
| 2012/0205876 A1 | 8/2012 | Fujimura et al. |

FOREIGN PATENT DOCUMENTS

| | | |
|---|---|---|
| JP | 10-252891 A | 9/1998 |
| JP | 2002-323133 A | 11/2002 |
| JP | 2011-169388 A | 9/2011 |
| WO | WO 2011/064888 A1 | 6/2011 |

OTHER PUBLICATIONS

PCT/ISA/237—Issued in PCT/JP2013/071020, dated Sep. 17, 2013.
Extended European Search Report, dated Feb. 10, 2016, for European Application No. 13828041.7.

* cited by examiner

TAPER-FACED COMPRESSION RING AND WIRE THEREFOR

FIELD OF THE INVENTION

The present invention relates to a piston ring used in internal combustion engines, compressed air engines, etc., particularly to a wire for a taper-faced compression ring having a tapered peripheral surface, and a taper-faced compression ring.

BACKGROUND OF THE INVENTION

Three to four piston rings are attached to a piston in an internal combustion engine. Two to three upper piston rings are called compression rings, which act not only to keep gas tightness between a combustion chamber and a crank room, but also to dissipate heat from the piston to a cylinder. Also, one to two lower piston rings are called oil rings, which act not only to form an oil film on an inner surface of the cylinder, but also to scrape excessive oil.

Known as a compression ring is a taper-faced piston ring having a tapered peripheral surface, which scrapes an oil attached to an inner wall of a cylinder liner or a cylinder (hereinafter referring to as "inner cylinder wall") when a piston moves downward, and forms an oil film by an wedge effect between a tapered surface and an inner cylinder wall when a piston moves upward, depending on a tapering angle $\theta$. With such features, it is widely used mainly as a second ring (second compression ring) or a third ring (third compression ring) for an automobile engine.

As described above, the taper-faced compression ring should have gas tightness and a sufficient oil-controlling function. To this end, it is important to keep a shape of a tapered face for a long period of time from a stage of running-in. As shown in FIG. 4, a taper-faced compression ring 20 actually has a cross section having a tapering angle $\theta$ and a ring width h1. To improve running-in, it is usually lapped in a sleeve having an inner diameter equal to a nominal diameter of the ring in a final production step, thereby forming a belt-like contact surface 4 on an outer peripheral surface 1 of the ring. Though the contact surface is formed by lapping for a long period of time without fail, depending on the circularity of the resultant ring (the circularity of the ring when charged into a truly circular sleeve having an inner diameter equal to the nominal diameter of the ring), it may have an increased contact width. In that case, surface pressure to a cylinder wall decreases, resulting in increased oil consumption. Increase in the contact width may invite increase in friction, though variable depending on the tension of the ring, resulting in lower fuel efficiency. In the production of a piston ring, it is desired that a lapped surface having a predetermined contact width L' is surely obtained from the aspect of quality, and that the lapping time is reduced from the aspect of cost.

JP 2002-323133 A discloses the formation of the above contact surface (described as "flat surface") in a wire in advance, to reduce working time such as lapping time. Further, it teaches a flat surface width of 0.05-0.3 mm. However, even though a wire has a flat surface in advance, a lapped surface having a predetermined contact width is not necessarily obtained surely, depending on the circularity of the resultant ring, etc. as described above, thus actually failing to reduce the lapping time.

OBJECT OF THE INVENTION

To solve the above problems, an object of the present invention is to provide a wire for a taper-faced compression ring, which can be provided with an initially conformable surface (contact surface) uniformly and rapidly without increasing a contact width on a peripheral surface, in the production process of the taper-faced compression ring. Another object of the present invention is to provide a long-life taper-faced compression ring having a small contact width, which would not be enlarged even if wearing progressed in response to engine mileage, thereby having reduced friction between an outer peripheral surface of the piston ring and a cylinder liner surface, and thus improved fuel efficiency.

DISCLOSURE OF THE INVENTION

In the present invention, it has been found that when a tapered surface corresponding to the outer peripheral surface of the ring is provided with a second tapered portion, which is then provided with a contact surface, a lapped surface having a predetermined contact width is surely formed, resulting in reduced lapping time.

In a conventional taper-faced compression ring with no second tapered portion, a small tapering angle (inclination angle $\theta$ of a tapered portion) generates large unevenness in contact width even with slight lapping, making it difficult to obtain an initial uniform surface pressure of a piston ring. On the other hand, when the tapering angle $\theta$ is large, oil attached to a cylinder wall is scraped when a piston moves upward, resulting in large oil consumption. In that point of view, it was expected before the present invention was made that the formation of a second tapered portion having a large tapering angle $\theta$ would extremely increase oil consumption as described above. As a result of intensive research, however, a long-life taper-faced compression ring has been obtained without increasing oil consumption, by setting the outward projection length H of the second tapered portion of a wire to 0.005-0.05 mm, and by setting the radial (outward) projection length H' of the lapped second tapered portion in a range of 0.001-0.048 mm. Also, lapping can form a contact surface having a predetermined contact width surely and rapidly, thereby suppressing the enlargement of wear width for a long period of time, and thus keeping a predetermined surface pressure.

Thus, the long wire of the present invention used for a taper-faced compression ring comprises adjacent outward inclined first and second tapered portions on a surface corresponding to an outer peripheral surface of the ring; the inclination angle $\theta 2$ of the second tapered portion being larger than the inclination angle $\theta 1$ of the first tapered portion; and an outer end of the second tapered portion being located radially outward than an outer end of the first tapered portion by 0.005-0.05 mm. It is preferable that the first tapered portion has an inclination angle $\theta 1$ of 1-5°, and that the second tapered portion has an inclination angle $\theta 2$ of 3-10°. The second tapered portion is preferably as long as ½ or less of the ring width h1.

The wire of the present invention for a taper-faced compression ring preferably comprises a step-shaped or hook-shaped recess portion in a corner between a surface corresponding to an outer peripheral surface of the ring and a surface corresponding to a lower surface of the ring.

The taper-faced compression ring of the present invention comprises adjacent outward inclined first and second tapered portions on a peripheral surface; the inclination angle $\theta 2$ of the second tapered portion being larger than the inclination angle $\theta 1$ of the first tapered portion; and the second tapered portion having a lapped surface, which is located radially outward than an outer end of the first tapered portion by 0.001-0.048 mm. It is preferable that the first tapered portion has an inclination angle θ1 of 1-5°, and that the second tapered portion has an inclination angle θ2 of 3-10°. The second tapered portion is preferably as long as ½ or less of the ring width h1, and the lapped surface preferably has a contact width L' of 0.005-0.3 mm.

The taper-faced compression ring of the present invention preferably has step-shaped or hook-shaped recess portion in a corner between an outer peripheral surface and a lower surface.

DESCRIPTION OF THE PREFERRED EMBODIMENTS

Figure 1A:
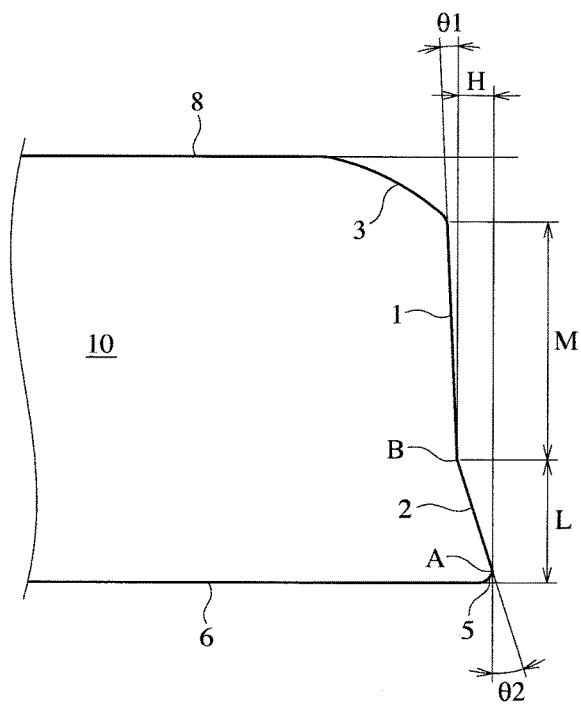
FIG. 1(a) is a cross-sectional view showing an example of wires for a taper-faced compression ring according to the present invention.
Figure 1B:
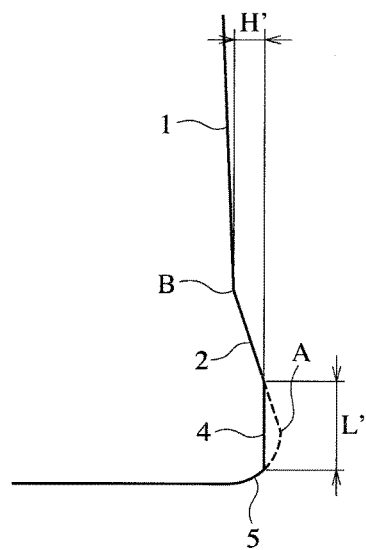
FIG. 1(b) is an enlarged cross-sectional view showing a second tapered portion of the taper-faced compression ring of the present invention, which is lapped in the production step to have a contact surface having a width L'.

FIG. 1(a) is a cross-sectional view showing a wire 10 according to an embodiment of the present invention, and FIG. 1(b) is an enlarged view showing a second tapered portion 2, which is lapped in the production step of the ring. A surface of the wire corresponding to an outer peripheral surface of the ring is provided with a first tapered portion 1 having a width M and a second tapered portion 2 having a width L both outward inclined and adjacent to each other. The inclination angle θ2 of the second tapered portion 2 is larger than the inclination angle θ1 of the first tapered portion 1. Corners of the wire between a surface corresponding to an outer peripheral surface of the ring and a surface corresponding to upper surface 8 and lower surface 6 of the ring are chamfered or rounded. Particularly, a lower end portion of the second tapered portion is preferably rounded to as small R as possible (for example, R=0.1 mm). When lapped in a sleeve, the second tapered portion 2 predominantly comes into contact with an inner surface of the sleeve, so that a contact surface 4 having a width L' is formed in a relatively short period of time.

An outer end A of the second tapered portion 2 is located outward than an outer end B of the first tapered portion 1, with a projection length H of 0.005-0.05 mm. When the projection length H is less than 0.005 mm, the second tapered portion 2 undesirably disappears by lapping or a short period of use as a ring, and initial performance cannot be kept by wearing during the engine operation. In addition, the second tapered portion 2 is undesirably susceptible to the forming precision of a ring. With the projection length H exceeding 0.05 mm, a ring formed by this wire scrapes oil attached to a cylinder wall when a piston moves upward, resulting in increased oil consumption. The projection length H is preferably 0.01-0.04 mm. The inclination angle θ1 of the first tapered portion 1 is preferably 1-5°, and the inclination angle θ2 of the second tapered portion 2 is preferably 3-10°. The axial width L of the second tapered portion 2 is preferably ½ or less of the ring width h1. Further, θ1/θ2 is more preferably 0.1-0.6.

Figure 2A:
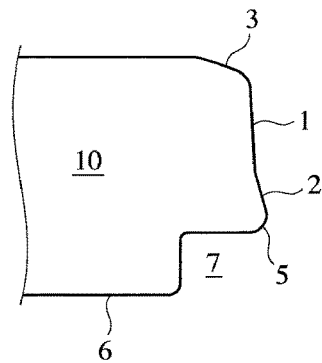
FIG. 2(a) is a cross-sectional view showing another example of wires for a taper-faced compression ring according to the present invention, which has a step-shaped recess portion in a corner between a surface corresponding to an outer peripheral surface of the ring and a surface corresponding to a lower surface of the ring.
Figure 2B:
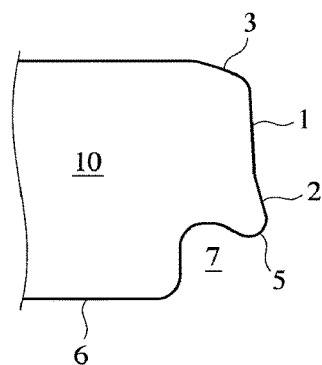
FIG. 2(b) is a cross-sectional view showing a further example of wires for a taper-faced compression ring according to the present invention, which has a hook-shaped recess portion in a corner between a surface corresponding to an outer peripheral surface of the ring and a surface corresponding to a lower surface of the ring.

The wire for the taper-faced compression ring of the present invention is produced by roll-forming or die-drawing. The wire may have a usual cross section shape of a compression ring except for the above features. For example, the wire may have a step-shaped (scraper ring) or hook-shaped (Napier ring) recess portion in a corner between a surface corresponding to an outer peripheral surface of the ring and a surface corresponding to a lower surface of the ring. It may also have a cross section shape having an internal-bevel or internal-step upper (lower) surface generating "twist." From the aspect of a forming step of a wire, the corner preferably has a chamfered or rounded shape, as long as there is no restriction in the specification. As cross-sectional views showing examples of wires in the present invention, FIG. 2(a) shows a wire having a step-shaped (scraper ring) recess portion 7 in a corner between surfaces 1 and 2 corresponding to an outer peripheral surface of the ring and a surface 6 corresponding to a lower surface of the ring, and FIG. 2(b) shows a wire having a hook-shaped (Napier ring) recess portion 7 in a corner.

The taper-faced compression ring of the present invention is produced by forming the above wire to a ring shape, subjecting it to working such as the grinding of side surfaces 6 and 8, the formation of a gap by grinding, etc., lapping it in a sleeve having an inner diameter equal to the nominal diameter of the ring, to form a belt-like contact surface 4 in the second tapered portion 2 on an outer peripheral surface of the ring. To this end, of course, the inclination angle θ2 of the second tapered portion 2 should be larger than the inclination angle θ1 of the first tapered portion 1. The inclination angle θ1 of the first tapered portion 1 is preferably 1-5°, and the inclination angle θ2 of the second tapered portion 2 is preferably 3-10°. Because the wire is usually lapped to about 0.002-0.01 mm, the lapped second tapered portion 2 of the ring is located radially outward than the outer end B of the first tapered portion by a projection length H' of 0.001-0.048 mm. With the projection length H' of less than 0.001 mm, namely, with substantially no second tapered portion 2 on the outer peripheral surface, it is difficult to keep the initial performance of an engine when wearing proceeds during the operation. With the projection length H' exceeding 0.048 mm, the ring scrapes an oil attached to a cylinder wall when a piston moves upward, resulting in increased oil consumption. The projection length H' is preferably 0.01-0.04 mm.

The taper-faced compression ring of the present invention comprises a second tapered portion 2 having an axial width L, which is preferably ½ or less of a ring width h1, like the wire. A lapped contact surface 4 preferably has a contact width L' of 0.005-0.30 mm. With the lapped surface having a contact width L' within this range, the surface pressure of the ring to a cylinder wall can be kept high, resulting in low oil consumption. Of course, in the case of a low-tension type, low friction can be kept, contributing to improvement in fuel efficiency.

Like the wire of the present invention, the taper-faced compression ring of the present invention may have a usual cross section shape of a compression ring, except for the above features. For example, the ring may have a step-shaped (scraper ring) or hook-shaped (Napier ring) recess portion in a corner between an outer peripheral surface and a lower surface. It may also have cross section shape having an internal-bevel or internal-step upper (lower) surface generating "twist."

Example 1 (E1) and Comparative Example 1 (C1)

In Example 1, a steel wire of SWOSC-V according to JIS was formed by rolling and drawing into a wire 10 of about 1 mm in width and about 2.3 mm in thickness for a taper-faced compression ring. The wire 10 had a first tapered portion 1 outward inclined with an inclination angle θ1 of 2.5° and a second tapered portion 2 inclined with an inclination angle θ2 of 5°, which were adjacent to each other on a surface corresponding to the outer peripheral surface of the ring, an outer end of the second tapered portion being located radially outward than an outer end of the first tapered portion by a projection length H of 0.010 mm. A corner 3 of the wire between a surface corresponding to the upper surface of the ring and a surface corresponding to the outer peripheral surface of the ring had a relatively large chamfer, and the second tapered portion 2 had a round lower end portion 5 with R=0.1 mm.

In Comparative Example 1, the same steel wire as in Example 1 was formed into a wire having the same width and thickness as in Example 1, which had no second tapered portion, though it had the first tapered portion inclined with an inclination angle θ1 of 2.5°.

These wires were worked to have predetermined side surface shapes and gaps, and then lapped in a completely circular sleeve of 71 mm in inner diameter, to obtain taper-faced compression rings 20 of 71 mm in nominal diameter d1, 1.0 mm in width h1, and 2.3 mm in thickness a1. In Example 1, lapping conditions were adjusted to have a lapped contact width L' of 0.074 mm. In the wire free of the second tapered portion 2 in Comparative Example 1, the same lapping conditions provided a lapped contact width of 0.302 mm. Of course, the rounded lower end portion 5 of the second tapered portion was also lapped. The entire surface was treated with zinc phosphate.

Engine Test (Measurement of Oil Consumption)

Using a 1-liter, 3-cylinder gasoline engine, these taper-faced compression rings 20 were subject as second rings to an engine test, to measure oil consumption (LOC: lubrication oil consumption) for 200 hours under predetermined operating conditions. Top rings and oil rings used were those attached to the engine in advance. The engine test was conducted two times, and the data of oil consumption measured two times were averaged. With the oil consumption in Comparative Example 1 as 100, the oil consumption in Example 1 was 50.5.

Measurement Test of Friction Force (Measurement of Friction Loss)

Figure 3:
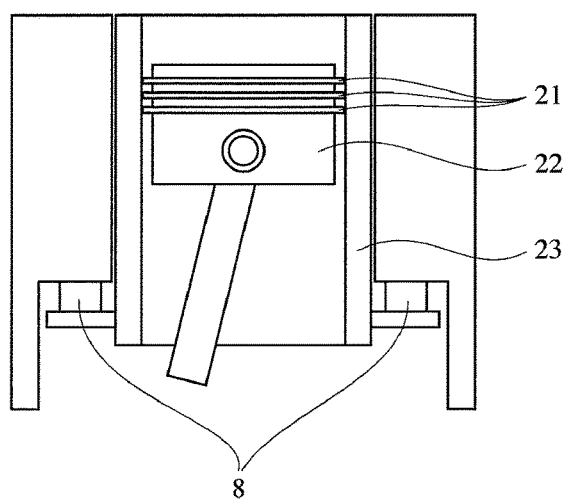
FIG. 3 is a schematic view showing an engine structure for measuring friction by a floating liner method.
Figure 4:
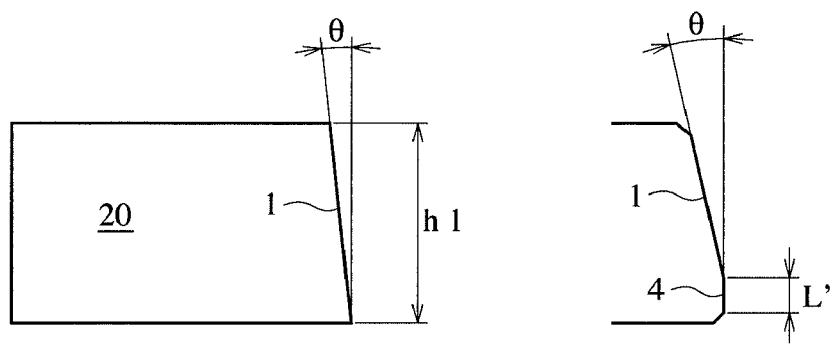
FIG. 4 is a cross-sectional view showing an example of conventional taper-faced compression rings.

To confirm the friction-loss-reducing effect of the taper-faced compression rings of the present invention as second rings, piston ring sets (top rings, second rings, oil rings) with fixed specifications of top rings and oil rings were assembled in a floating-liner-type friction-measuring engine, to evaluate friction loss in terms of a friction mean effective pressure (FMEP). A cast iron cylinder liner having a ten-point-averaged surface roughness Rz of 2-4 μm was used as a mating member sliding with the piston rings. FIG. 3 shows the engine structure for friction measurement using the floating liner method. A friction force applied to the cylinder liner when the piston rings attached to the piston slid up and down was measured by load sensors 8 mounted to the cylinder liner. The test conditions for measuring friction loss using the floating-liner-type friction-measuring engine are as follows. With FMEP in Comparative Example 1 as 100, the FMEP was 63.0 in Example 1. Incidentally, the top rings, the second rings and the oil rings had tensions of 3 N, 2 N, and 15 N, respectively.

Test Conditions:
Rotation number of engine: 2000 rpm,
Load: 15 N·m,
Lubricating oil temperature: 87° C., and
Test time: 10 hours.

Examples 2-18 (E1-E18) and Comparative Examples 2-5 (C2-C5)

Wires 10 and taper-faced compression rings 20 were produced in the same manner as in Example 1, except for changing the inclination angles of the first and second tapered portions, and the projection length H of the outer end of the second tapered portion to the outer end of the first tapered portion (and thus the width L of the second tapered portion) as shown in Table 1. Lapping was also conducted in the same manner as in Example 1, to provide the contact width shown in Table 1. The engine test and the friction force measurement test were also conducted in the same manner as in Example 1. The test results are shown in Table 1, together with those of Example 1 and Comparative Example 1.

TABLE 1

| No. | First Tapered Portion θ1 (°) | Second Tapered Portion | | | | FMEP | LOC |
| | | θ2 (°) | H (mm) | L (mm) | H' (mm) | L' (mm) | | |
| --- | --- | --- | --- | --- | --- | --- | --- | --- |
| E1  | 2.5 | 5  | 0.010 | 0.114 | 0.006 | 0.074 | 63.0 | 50.5 |
| E2  | 2.5 | 5  | 0.025 | 0.286 | 0.020 | 0.088 | 83.2 | 56.1 |
| E3  | 2.5 | 7  | 0.010 | 0.081 | 0.006 | 0.061 | 55.8 | 43.7 |
| E4  | 2.5 | 7  | 0.020 | 0.163 | 0.014 | 0.083 | 70.6 | 52.9 |
| E5  | 2.5 | 7  | 0.030 | 0.244 | 0.022 | 0.104 | 85.6 | 61.9 |
| E6  | 2.5 | 5  | 0.030 | 0.343 | 0.017 | 0.198 | 91.7 | 79.0 |
| E7  | 2.5 | 10 | 0.030 | 0.170 | 0.026 | 0.051 | 68.3 | 50.1 |
| E8  | 5   | 7  | 0.010 | 0.081 | 0.004 | 0.083 | 58.2 | 53.1 |
| E9  | 5   | 7  | 0.030 | 0.244 | 0.022 | 0.104 | 85.6 | 61.9 |
| E10 | 5   | 10 | 0.010 | 0.057 | 0.005 | 0.060 | 45.7 | 40.4 |
| E11 | 5   | 7  | 0.050 | 0.407 | 0.025 | 0.270 | 90.4 | 88.5 |
| E12 | 2.5 | 7  | 0.015 | 0.122 | 0.005 | 0.125 | 69.5 | 71.0 |
| E13 | 2.5 | 7  | 0.020 | 0.163 | 0.010 | 0.125 | 75.7 | 70.9 |
| E14 | 2.5 | 7  | 0.025 | 0.204 | 0.015 | 0.125 | 81.9 | 70.9 |
| E15 | 2.5 | 7  | 0.040 | 0.326 | 0.020 | 0.223 | 90.2 | 85.4 |
| E16 | 1   | 3  | 0.005 | 0.095 | 0.002 | 0.082 | 61.7 | 54.6 |
| E17 | 2.5 | 7  | 0.050 | 0.407 | 0.043 | 0.094 | 85.1 | 64.0 |
| E18 | 1   | 3  | 0.010 | 0.191 | 0.007 | 0.075 | 69.0 | 52.0 |
| C1  | 2.5 | —  | —     | —     | —     | 0.302* | 100 | 100 |
| C2  | 2.5 | 7  | 0.080 | 0.652 | 0.070 | 0.125 | 97.3 | 104.9 |
| C3  | 2.5 | 10 | 0.100 | 0.567 | 0.088 | 0.116 | 92.6 | 103.5 |
| C4  | 2.5 | 7  | 0.060 | 0.489 | 0.045 | 0.175 | 93.6 | 98.9 |
| C5  | 2.5 | 7  | 0.070 | 0.570 | 0.057 | 0.155 | 98.5 | 97.2 |

Note:
*In C1, the first tapered portion had a contact surface, because of no second tapered portion.

Any of Examples 1-18 and Comparative Examples 2-5 had the second tapered portion with a tapering angle of 3-10°. The projection length H of the outer end of the second tapered portion 2 to the outer end of the first tapered portion was 0.005-0.050 mm in Examples 1-18, while it was 0.08 mm in Comparative Example 2, 0.10 mm in Comparative Example 3, 0.60 mm in Comparative Example 4, and 0.070 mm in Comparative Example 5. Because the lapped contact width L' was as small as 0.116-0.175 mm in Comparative Examples 2-4, high surface pressure to a cylinder wall was expected. However, because a large radial projection length H' remained in the second tapered portion 2, they suffered oil consumption substantially on the same level as in a conventional example (Comparative Example 1), despite high surface pressure. Examples 1-18 had friction (FMEP) of 8-54% and oil consumption of 11-59%, which were remarkably improved than in Comparative Example 1, because radial projection lengths H and H' of the outer end of the second tapered portion to the outer end of the first tapered portion were within predetermined ranges, and because the lapped contact width L' was as small as 0.051-0.270 mm.

Effect of the Invention

Because the wire of the present invention for a taper-faced compression ring has a second tapered portion below a first tapered portion constituting an outer peripheral surface of the ring, a contact surface is formed in the second tapered portion in a lapping step in the production of the ring. With this second tapered portion, a contact surface having a contact width within a predetermined range can be obtained surely and rapidly. Also, the second tapered portion makes the contact width of a lapped surface and working time less susceptible to the circularity (precision) of the resultant ring.

Because the taper-faced compression ring of the present invention has a contact surface with a predetermined contact width L', it needs a short period of time for running-in. Because extreme increase in contact width is avoided by the second tapered portion, a predetermined surface pressure to a cylinder wall can be kept for a long period of time, resulting in low oil consumption for a long period of time. This function of keeping a small contact width remarkably contributes to a small friction force and improved fuel efficiency, particularly in the case of a low-tension type.

What is claimed is:

1. A taper-faced compression ring comprising:
   an upper surface;
   a lower surface; and
   an outer peripheral surface of said ring, wherein the outer peripheral surface of said ring is formed of an outward inclined first tapered portion and second tapered portion,
   the outward inclined first tapered portion is adjacent to the upper surface, the outward inclined second tapered portion is adjacent to the lower surface, and the outward inclined first tapered portion and the outward inclined second tapered portion are adjacent to each other, and
   an inclination angle $\theta 2$ of said second tapered portion is larger than an inclination angle $\theta 1$ of said first tapered portion, so that the outward inclined second tapered portion extends outwardly from a lower end of the outward inclined first tapered portion,
   said second tapered portion of the outer peripheral surface has the inclination angle $\theta 2$ of 3-10°,
   said second tapered portion has a lapped surface, which is located radially outward than an outer end of said first tapered portion by 0.002-0.015 mm, and
   said lapped surface has a contact width of 0.060-0.125 mm, and wherein said taper-faced compression ring attached to a piston slides up and down in a cylinder liner and the outer peripheral surface contacts with the cylinder liner.

2. The taper-faced compression ring according to claim 1, wherein said first tapered portion has the inclination angle $\theta 1$ of 1-5°.

3. The taper-faced compression ring according to claim 1, wherein said second tapered portion has an axial width, which is ½ or less of the axial ring width h1.

4. The taper-faced compression ring according to claim 1, which comprises a step-shaped or hook-shaped recess portion in a corner between the outer peripheral surface and a lower surface.

5. The taper-faced compression ring according to claim 1, wherein the inclination angle $\theta 2$ of said second tapered portion is 7-10°.

6. A long wire for the taper-faced compression ring according to claim 1, which comprises:
   an upper surface;
   a lower surface; and
   a surface corresponding to an outer peripheral surface of said ring, wherein the surface corresponding to the outer peripheral surface is formed of an outward inclined first tapered portion and an outward inclined second tapered portion,
   the outward inclined first portion is adjacent to the upper surface, the outward inclined second tapered portion is adjacent to the lower surface, and the outward inclined first tapered portion and the outward inclined second tapered portion are adjacent to each other,
   the inclination angle $\theta 2$ of said second tapered portion is larger than the inclination angle $\theta 1$ of said first tapered portion, so that the outward inclined second tapered portion extends outwardly from a lower end of the outward inclined first tapered portion, an outer end of said second tapered portion is located outward than an outer end of said first tapered portion by 0.005-0.040 mm prior to lapping, and
   said second tapered portion has the inclination angle $\theta 2$ of 3-10°.

7. The wire for a taper-faced compression ring according to claim 6, wherein said first tapered portion has the inclination angle $\theta 1$ of 1-5°.

8. The wire for a taper-faced compression ring according to claim 6, wherein said second tapered portion has an axial width, which is ½ or less of the axial ring width h1.

9. The wire for a taper-faced compression ring according to claim 6, which comprises a step-shaped or hook-shaped recess portion in a corner between a surface corresponding to the outer peripheral surface of the ring and a surface corresponding to a lower surface of the ring.

* * * * *